(12) United States Patent
Cope et al.

(10) Patent No.: US 10,295,356 B1
(45) Date of Patent: May 21, 2019

(54) DIGITAL ATLAS FOR DELIVERING PERSONALIZED AND RELEVANT NOTIFICATIONS

(71) Applicant: STATE FARM MUTUAL AUTOMOBILE INSURANCE COMPANY, Bloomington, IL (US)

(72) Inventors: Craig Cope, Bloomington, IL (US); Ryan Gross, Normal, IL (US); Mark E. Clauss, Bloomington, IL (US); Steven Joseph Balbach, Bloomington, IL (US); Rick Lovings, Bloomington, IL (US); Jennifer L. Crawford, Normal, IL (US); Vicki King, Bloomington, IL (US); Daryoush Hakimi, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/974,304

(22) Filed: May 8, 2018

(51) Int. Cl.
| | |
|---|---|
| *H04W 24/00* | (2009.01) |
| *G01C 21/34* | (2006.01) |
| *H04W 4/021* | (2018.01) |
| *H04W 4/024* | (2018.01) |
| *G01C 21/36* | (2006.01) |
| *G06F 17/30* | (2006.01) |
| *G06F 16/9537* | (2019.01) |

(52) U.S. Cl.
CPC ..... *G01C 21/3484* (2013.01); *G01C 21/3415* (2013.01); *G01C 21/3641* (2013.01); *G01C 21/3694* (2013.01); *H04W 4/021* (2013.01); *H04W 4/024* (2018.02); *G01C 21/3682* (2013.01); *G01C 21/3685* (2013.01); *G06F 16/9537* (2019.01); *G06F 17/3087* (2013.01)

(58) Field of Classification Search
CPC ........... G01C 21/3484; G01C 21/3415; G01C 21/3641; G01C 21/3694; G01C 21/3682; G01C 21/3685; H04W 4/024; H04W 4/021; G06F 17/3087
USPC ........................ 455/456.3, 418, 414.3, 550.1
See application file for complete search history.

(56) References Cited

U.S. PATENT DOCUMENTS

| 7,315,783 | B2 * | 1/2008 | Lou ......................... G01V 1/305 367/38 |
| 8,626,863 | B2 * | 1/2014 | Huang ................ H04L 12/1827 709/206 |
| 2010/0214090 | A1 * | 8/2010 | Sartini .................. H04L 12/581 340/517 |

(Continued)

*Primary Examiner* — Danh C Le (74) *Attorney, Agent, or Firm* — Marshall, Gerstein & Borun LLP; Randall G. Rueth (57) ABSTRACT

Systems and methods for generating and delivering personalized and relevant notifications to a user are provided. According to certain aspects, a mobile device may receive activity data from a user of the mobile device. The mobile device may identify a set of real-time sensor data relevant to the activity data. The mobile device may generate a notification based on the activity data and the set of real-time sensor data. The mobile device may identify a set of user profile data relevant to the activity data and the set of real-time sensor data, and further identify a set of static data relevant to the set of user profile data. Based on the relevant data, the mobile device may modify the notification. Finally, the mobile device may deliver the notification to the user via a user interface.

18 Claims, 4 Drawing Sheets

(56) References Cited

U.S. PATENT DOCUMENTS

| | | | |
|---|---|---|---|
| 2013/0073389 A1* | 3/2013 | Heath | G06Q 30/02 |
| | | | 705/14.54 |
| 2014/0101248 A1* | 4/2014 | Felder | H04L 67/22 |
| | | | 709/204 |
| 2015/0356607 A1* | 12/2015 | Civanlar | H04W 4/21 |
| | | | 705/14.58 |
| 2016/0371973 A1* | 12/2016 | Holleczek | G08G 1/0129 |
| 2017/0072850 A1* | 3/2017 | Curtis | B60W 50/0097 |
| 2018/0101854 A1* | 4/2018 | Jones-McFadden | |
| | | | G06Q 30/0203 |

\* cited by examiner

DIGITAL ATLAS FOR DELIVERING PERSONALIZED AND RELEVANT NOTIFICATIONS

TECHNICAL FIELD

The present disclosure is directed to a digital atlas for facilitating the transmission of notifications to a user of a mobile device. More particularly, the present disclosure is directed to systems and methods for generating and delivering personalized and relevant notifications to the user.

BACKGROUND

An atlas, also known as a road map, or road atlas, is a map (or collection of maps) that typically displays roads, and/or transportation links between locations on the map, as well as additional information of interest. Some of the additional information of interest presented in an atlas often includes geographic features and political boundaries, as well as geopolitical, social, religious and economic statistics. Atlases often have information about the map, and information about points of interest located on the map.

Since before the advent of the automobile as a means of transportation people have been using atlases to help them plan and navigate trips. Before the internet, and more specifically before internet enabled smart phones, people would often use atlases to plan and navigate automobile trips, because atlases often contained a large amount of relevant information for trip planning and navigation purposes. As such, a paper atlas used to be a common item found in an automobile. With the rise of the internet, much of the information previously contained in a paper atlas is now distributed amongst a variety of websites on the internet, and applications installed on a person's smart phone. When planning, or navigating a trip, a person often has to consult multiple sources to get the same amount of information that they would traditionally receive in a paper atlas. Trips are now typically planned using websites and applications on a person's smart phone. Unfortunately, these tools, websites and applications, are not responsive to potential changes to the trip based on relevant information encountered along a proposed route for the trip, or changes that occur as a person progresses through a planned trip. Similarly, these tools lack predictive abilities to anticipate potential changes to a person's trip.

SUMMARY

A digital atlas for delivering personalized and relevant notifications is provided. The digital atlas may make a user aware of a variety of relevant information for trip planning purposes, as well as information that a user of the digital atlas deems important through a personalization system.

In one embodiment, a computer-implemented method on a mobile device for generating and delivering personalized and relevant notifications to a user is provided. The method may include receiving activity data; and identifying a corresponding set of real-time sensor data relevant to the activity data. The method may include generating a notification using the activity data and the set of real-time sensor data, and identifying a set of user profile data relevant to the activity data and the set of real-time sensor data. The method may also include further identifying a set of static data relevant to the set of user profile data. The method may include modifying the notification using the set of user profile data and the set of static data, and delivering the notification to the user.

In another embodiment, a system for delivering personalized and relevant notifications to a user is provided. The system may include a user interface configured to communicate with the user, a memory configured to store non-transitory computer executable instructions, and a processor configured to interface with the memory and the user interface, wherein the processor is configured to execute the non-transitory computer executable instructions to cause the processor to take a particular action. The processor may be configured to receive activity data from a user, identify a set of real-time sensor data relevant to the activity data, wherein to identify the set of real-time sensor data includes receiving a set of real-time sensor data from a set of data sources, and generate a notification using the activity data and the set of real-time sensor data. The processor may be further configured to identify a set of user profile data relevant to the activity data and the set of real-time sensor data, and further identify a set of static data relevant to the set of user profile data. Lastly, the processor may be configured to modify the notification using the set of user profile data and the set of static data, and deliver the notification to the user via the user interface.

BRIEF DESCRIPTION OF THE DRAWINGS

The drawings show examples of the presently discussed arrangements. However, the present embodiments are not limited to what is shown.

FIG. 1 illustrates an exemplary environment that the personalized and relevant notification system configured to generate and personalized and relevant deliver notifications to a mobile device operates in.

DETAILED DESCRIPTION

A digital atlas for delivering personalized and relevant notifications is provided. The digital atlas delivers a single point of connection for personalized and relevant weather, traffic, transit, events, interests, conveniences and offers to a user. Unlike a paper atlas, which in the past was relegated to a little piece of paper tucked in the glove box of an automobile with limited user interaction, the digital atlas imparts daily value to users. By proactively providing relevant and personalized information the digital atlas provides insightful information at the right time, and in the right place, to its users.

In one embodiment, the digital atlas may be a software application that runs on a user's mobile device, such as a smart phone. The digital atlas puts a new, updated spin on the traditional road atlas. Beyond being a map, or collection of maps, the digital atlas may also be a navigation application. In other embodiments, the digital atlas may interface with existing navigation applications on a user's smart phone helping to provide personalized and relevant information to those existing applications. The digital atlas provides for multiple modes of travel and for all types of routes. Multiple modes of travel, or transportation, may be travel by automobile, by public transit, by bicycle, or by walking. For example, the digital atlas provides information for trips taken in an automobile, trips taken on public transit, trips taken while bicycling, and trips taken while walking. The digital atlas provides relevant and personalized information during the trip planning phase, (i.e. before a trip has begun) as well as while the trip is underway. Additionally, the user is able to personalize their digital atlas by indicating their preferences for traveling.

While the digital atlas is in use it may collect usage data in the background to help improve the application. The usage data may be used by the digital atlas to perform analytics on the usage data to identify user patterns. For the user, value is derived from the integration of an array of features which apply to multiple use cases into one application, the digital atlas. The broad set of features provides ample supply of data sets on the user's behaviors and frequent routes. This data allows the digital atlas to apply machine learning techniques, which will be described below, to better anticipate and predict a user's preferences and travel plans.

In one embodiment, the digital atlas may passively run in the background on the user's mobile device. For example, the user turns on their smart phone and the digital atlas is automatically started without user interaction. This way the digital atlas is said to be running in the background without the user actively starting the application. Similarly, the user may open the digital atlas and actively choose that the application run in the background while the user's smart phone is turned on. While the digital atlas is running in the background, relevant and personalized notifications based on custom settings and learned behavioral patterns are pushed to the user in real-time regardless of whether the user is driving, walking, biking or riding public transit. Alternatively, the user actively engaging the digital atlas features to find routes, events, points of interest, parking, dining and accommodations is an option to the user for both designing a trip and last minute planning. The digital atlas brings all this information together for a simple, unified experience.

The digital atlas also provides suggestions to improve the user's everyday commute with real-time and predictive traffic, metro transit data, weather notifications, as well as safe and efficient travel recommendations. This information may be layered in with services to simplify parking and find points of interest, restaurants, and events. In some embodiments the user also has the option to share favorite routes, reviews and experiences with friends (fellow digital atlas users) or even a community of digital atlas users. These features allow the digital atlas to provide a simplified experience that encourages safe, efficient exploration while providing comprehensive trip related features to users.

The digital atlas makes a user aware of a variety of relevant information for trip planning purposes, as well as information that a user of the digital atlas deems important through a personalization system. Relevant information may be determined by a user's preferences, by the digital atlas anticipating or predicting the user's behavior, or some combination of user preferences and digital atlas suggestions. The relevant information may be relevant to the user, to a route that the user is planning, to routes that the user travels regularly, to routes that are shared with the user by other users of the digital atlas, and any other type of information relevant to the user traveling. Additionally, the relevant information may be insurance data from previous crash information, dangerous intersections, etc. provided by an insurance provider the user has a relationship with.

Prior to the digital atlas a user would need to toggle between multiple applications or services to plan trips, or find things to do. For example, a user would need to use multiple applications and services to accomplish the following steps when planning a route: 1. map a pedestrian, cyclist, transit or driving route; 2. reference weather in a separate application; 3. find nearby dining, shops or entertainment suitable to location and weather; 4. copy the next address into a navigation application after each waypoint; and 5. recalculate the route. The digital atlas provides the tools for a user to accomplish all of the above steps in the same application.

Figure 1:
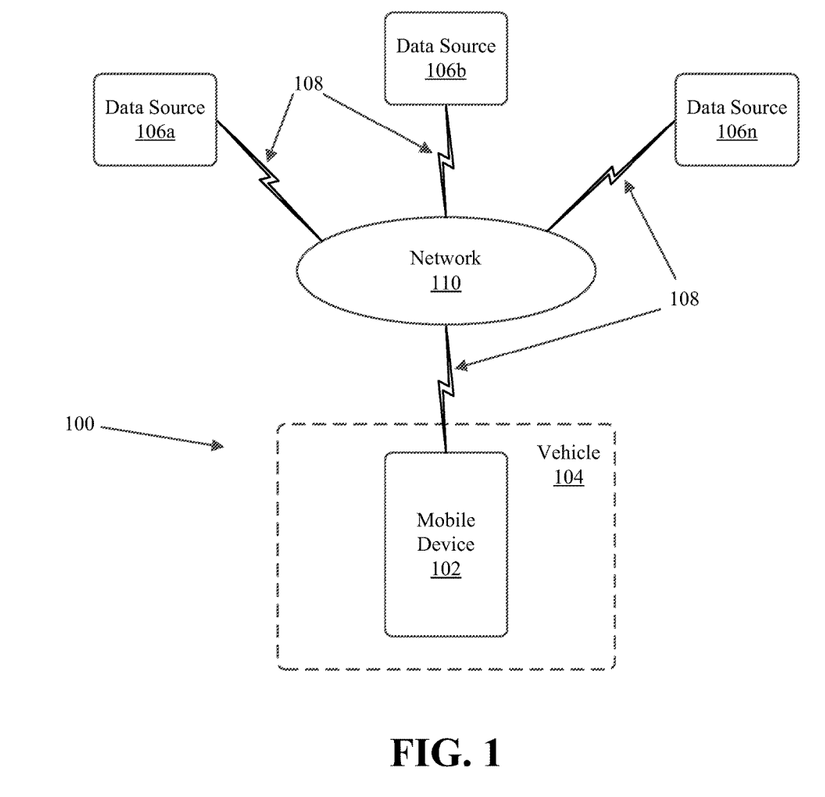

FIG. 1 illustrates an exemplary environment that the personalized and relevant notification system 100, such as the digital atlas mentioned above, operates in. The system may be configured to generate and deliver notifications to a mobile device. In some embodiments, the system 100 may be the mobile device 102. In other embodiments, the system 100 includes both a mobile device 102 and a vehicle 104. FIG. 1 includes a mobile device 102, a set of data sources 106a . . . n, a network connection 108, and a network 110. In some embodiments the mobile device 102 is located inside of a vehicle 104. The vehicle 104 may be an automobile, a public transit vehicle (such as a bus or train), or a bicycle that a user of the mobile device 102 is using. The user of the mobile device 102 may use the mobile device 102 for trip planning purposes, or for commuting purposes. As part of the process of planning trips the mobile device, through the digital atlas, may connect to a variety of data sources 106a . . . n to provide the user with personalized and relevant information. The digital atlas is connected to the data sources 106a . . . n through a network connection 108 and network 110. The network connection 108 may be a wireless connection, a wired connection, a Bluetooth connection, a mobile telephony connection, or any other data connection. The network 110 may be the Internet, a local area network, a wireless network, a wired network, a wide area network, a wireless local area network, a metropolitan area network, or any other type of network.

FIG. 1 shows multiple data sources 106a . . . n that may be used by the digital atlas. The digital atlas relies upon multiple types of data sources that cover a broad range of inputs relevant to a user. In some embodiments, the mobile device 102 is also a data source for the digital atlas. The data sources 106a . . . n may be external to the mobile device 102 (meaning existing on a network separate from the network the mobile device 102 is connected to), or the mobile device 102 and the data sources 106a . . . n are connected to each other on the same network. The data sources 106a . . . n may be service providers with which the user has an agreement. For example, the data source 106a may be an insurance provider that provides the user with automobile insurance that covers the liability of the vehicle 104. In other embodiments, the data source 106a . . . n is an online web service, or application on the user's smart phone, that the user frequently uses to learn information about new restaurants or find parking locations, such as Yelp or ParkWhiz.

In general, the data sources 106a . . . n provide two different types of data utilized by the digital atlas: real-time data, and static data. The digital atlas may rely upon both real-time data and static data during its operation. Real-time data may be any data that is updated continuously and immediately after the data is collected. Real-time data is typically delivered near instantaneously after it is collected.

There is a minimal amount of lag time between when real-time data is collected and real-time data is delivered. Typically, real-time data is collected via sensors that monitor environmental conditions. In some embodiments, the real-time data may be collected by sensors associated with the data sources 106*a* . . . n, sensors located in the mobile device 102, or in the vehicle 104, or some combination thereof. Examples of real-time data would be traffic data, weather data, and in the context of the digital atlas, activity data collected on a user mobile device 102 (such as a user's smart phone), fuel level data when the digital atlas is used as part of a vehicle 104, operation data for the vehicle 104 components (in case those components need servicing), and predicted user preference data or user behavior data. For example, if one of the data sources 106*a* . . . n was a traffic application, the digital atlas would receive real-time traffic data along a route that a user is traveling or planning to travel. Similarly, if one of the data sources 106*a* . . . n was a weather application, the digital atlas would receive real-time weather data along a route that a user is using or planning to use. By providing integrated weather alerts with traffic alerts the digital atlas is significantly different from other services and applications that handle mapping and routing. The combination of predictive traffic and weather data allows for more accurate trip planning, as well as better informing the user of what lies ahead while on their trip. In one embodiment, the digital atlas passively runs in the background and is aware of user habits through data collection. The digital atlas may provide an alert if a standard route or calendar event is impacted or compromised by current or predicted traffic and weather. The digital atlas will also suggest safer routes using current & forecasted traffic and weather. The digital atlas may even propose alternative stops that appeal to users to nudge them towards safer choices.

Conversely, static data may be defined as any data that is not real-time data. Static data is not updated continuously. Rather static data may be updated periodically, hourly, daily, weekly, monthly, yearly, and so on. Static data may also be updated as the underlying data changes. For example, the date of a concert a user is interested in is a piece of static data. Accordingly, if the date of the concert is changed at the last minute that may be considered an example of static data changing. Some examples of static data are: user preferences stored by the digital atlas, the location of gas stations, the location of restaurants, the location of lodgings (such as hotels), the location of and time for concerts or other events, the location of movie theaters, the location of shopping malls, the location of points of interest (e.g. National Parks such as Arches National Park and Zion National Park), location of parking, received routes or received suggestions from another user in the digital atlas community, location of toll booths, discounts and promotional offers related to locations in the digital atlas or along a user's route, facts and trivia information about locations in the digital atlas, and even information about local radio stations.

Another example of a user using static data, may be the user opening the digital atlas to set preferences and filters to find food, random points of interest, accommodations, parking, transit, gas stations. To provide much of this content, the digital atlas may rely upon existing content providers, such as Yelp or ParkWhiz, to provide both national and local information. In alternative embodiments, agents (which may be users of the digital atlas, and/or employees of a service the user has an agreement with such as an insurance provider) may supply information about small town events to layer into the digital atlas static or real-time data sets so that the digital atlas offers the most possibilities of unique experiences. The digital atlas may use a discover feature, which will offer capabilities to narrow the search results to within a user defined distance. This will allow users to customize results based upon the direction of a route and how far they are willing to travel off their route. The majority of the data used in the immediately preceding example may be static data, but may also include real-time data such as traffic and weather data.

Figure 2:
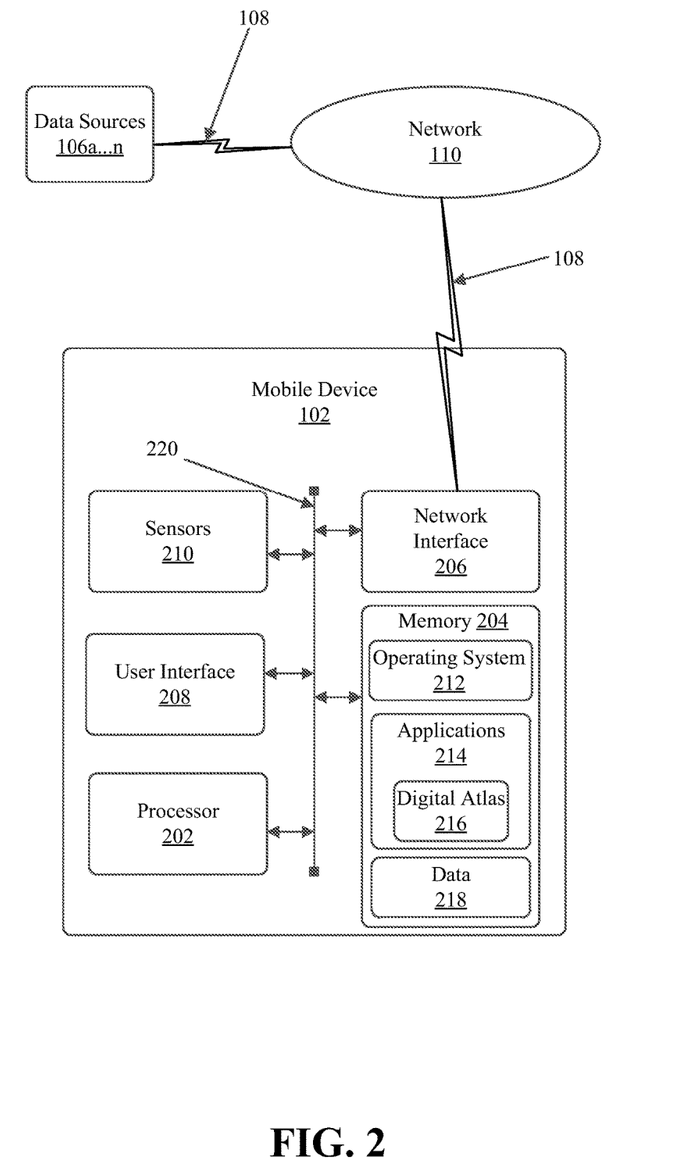
FIG. 2 illustrates an exemplary mobile device for generating and delivering personalized and relevant notifications to a user.

FIG. 2 illustrates an exemplary mobile device 102 for generating and delivering personalized and relevant notifications to a user. FIG. 2 includes a mobile device 102, data sources 106*a* . . . n, a network connection 108, and a network 110. The mobile device 102 may include a processor 202, a memory 204, a network interface 206, a user interface 208, sensors 210, an operating system 212, applications 214, a digital atlas 216, data sets 218, and a computer bus 220. In other embodiments, the mobile device 102 may include more or less components. The various embodiments of the components of the mobile device 102 are described in more detail below. The processor 202 may be configured to interface with the memory 204 and the user interface 208, wherein the processor 202 is configured to execute the non-transitory computer executable instructions to cause the processor 202 to execute the operation of the mobile device 102 and the digital atlas 216 described below. The mobile device 102 may be a smart phone, a tablet, a global position satellite device (known as a GPS device), a built-in navigation application incorporated into a vehicle (such as the vehicle 104 of FIG. 1).

In one embodiment of the digital atlas 216, the mobile device 102 receives at the processor 202 activity data collected on the user mobile device. The activity data may be data indicating the user has opened an application on a user device. The application may be one of the applications 214 stored in the memory 204. As previously mentioned, the activity data may be data indicating that the user has opened a navigation application on their smart phone, or that the user opened the digital atlas 216 on their smart phone. Similarly, the activity data may be a time of day, a geographic location of the user, application data on the mobile device 102, operating system 212 data, past activity data for the user, predicted activity data for the user, or some combination thereof. Past activity data may include locations that a user frequents, businesses that a user frequents, events a user frequently attends, points of interest a use frequents, as well as any location a user has visited. Similarly, the predicted user activity may be any activity that the digital atlas 216 predicts a user may undertake based off of past user activity, which may be predicted using the machine learning techniques described below. The past activity data and predicted activity data may be stored in the data 218 in the memory 204 of the mobile device 102. In other embodiments, the past activity data and predicted activity data may be stored in a cloud storage service that the user has a service agreement, or may be stored by an insurer that the user has an agreement with.

The processor 202 may identify a set of real-time sensor data that is relevant to the activity data. In some embodiments, the real-time sensor data may be weather data, traffic data, or some combination thereof, received from a set of data sources 106*a* . . . n. As part of identifying relevant real-time sensor data the digital atlas 216 may receive data from the data sources 106*a* . . . n, the sensors 210, or some combination of both.

The set of real-time sensor data may be defined to be relevant to the activity data if the data collected by the sensors may have an impact on the activity data. For example, if the activity data indicates that the user has opened the digital atlas 216 then the digital atlas 216 may anticipate that the user intends to input routing information for an upcoming route and as such real-time sensor weather data would be relevant to the activity data. Similarly, the user may have opened an alarm clock application, while the digital atlas 216 is running in the background, and the digital atlas 216 may anticipate, from learning the user behavior, that traffic data is relevant to the activity data because the user is about to begin their commute.

The processor 202 may generate a notification using the activity data and the set of identified real-time sensor data. In some embodiments, the notification may be a suggested route, a weather alert, a traffic alert, an event alert, or some combination thereof. As described above, the user may open a navigation application or alarm clock application on their smart phone and the digital atlas 216 may generate an alert that may impact their commute time. The alert is then included in a notification. Similarly, if the user is planning a trip and there is relevant weather data that may impact the timing of the trip a weather alert and traffic alert may be generated. In sum, when at home or away, users may receive notifications with suggested departure times based on anticipated travel times, as well as weather and traffic events when relevant. The notifications may take the form of push notifications, which may notify a user of new messages or events even when the user is not actively using an application. As a user is traveling, the digital atlas 216 continually checks traffic and weather, notifying the user along their route if there are any incidents. If applicable, an alternate route or itinerary change may be recommended.

The processor 202 may identify a set of user profile data relevant to the activity data and the set of real-time sensor data. In some embodiments, the user profile data may be preference data indicated by the user, favorites data received by the user from another user, or some combination thereof, stored in the memory. The preference data may be indicated by the user when the user initially uses the digital atlas 216 for a first time, and the preference data may be updated any time that the user wants to through the digital atlas 216.

For example, the first time the user sets up the digital atlas 216 the user progresses through a new user setup. Users can opt to identify their home, work, school, and any other custom location that is a frequent destination. The digital atlas 216 will also request preferences on cuisine and restaurant chains, lodging style, hotel chain, gas stations etc. The digital atlas 216 gives users control over their level of interaction with the app (low, medium, or high rate of notifications). As an example, the level of interaction may be equivalent to a low level being once every day, a medium level of notification every hour, and a high level of notification as soon as notifications are generated. Users are able to define what displays in their Features menu (entertainment, food, gas, weather, etc.). The Features menu may be a list of frequently used data of interest to the user. For example, the Features menu may include restaurants, current weather, and current traffic.

If users opt to allow the digital atlas 216 access to their credit card and or calendar, options within the digital atlas 216 could pre-populate based on planned events, or user history. The digital atlas 216 collects this information from the user and builds a user profile for the user. The digital atlas 216 tabulates where users go and how often so the digital atlas 216 can begin proactively suggesting safer or more efficient routes, places users don't usually visit but might be interested in, etc. In some embodiments, the digital atlas 216 makes use of machine learning to proactively suggest things the user would be interested in. By building out a user profile, the digital atlas 216 becomes useful on a daily basis for the user's commute and errands, as well as when the user is traveling. For instance, if a user always grabs coffee from Starbucks® on their way to work, the digital atlas 216 will automatically notify the user of a nearby Starbucks® (or other coffee shops) at the appropriate time when away on a trip. To further enhance utility, the digital atlas 216 may start offering discounts based on user preferences, habits and location. In some embodiments, the digital atlas 216 may be a product offered by an insurer that the user has an agreement with, and as such the data that is tabulated, or collected may be used by the insurer in calculations related to usage based insurance for the user, telematics applications (e.g. improvements to the digital atlas 216 or companion applications for the digital atlas 216), and other products.

The processor 202 may also identify a set of static data relevant to the set of user profile data. In some embodiments, the static data may be event data, lodging data, restaurant data, parking data, or some combination thereof, received from a set of data sources. The data sources may be the data sources 106a . . . n, the data 218 stored in the memory 204 of the mobile device 102, or other cloud based data sources. The relevance of the static data may be in part determined by user preferences indicated by the user and by user preferences anticipated by the digital atlas 216 through the use of machine learning techniques. An example of static data that may be relevant is if the user has a preference for taking public transportation to and from work. The digital atlas 216 may provide travel times to the nearest transit stops, as well as the locations of Starbucks® to the provided transit stops as the user approaches them. Conversely, if a user is building a route in the digital atlas 216 that takes advantage of public transit the digital atlas 216 may proactively determine that any static data sets related to parking spots for bicycle would not be relevant to the user. Using the identified data, the processor 202 may modify the notification using the set of user profile data and the set of static data. Lastly, the processor 202 may deliver the notification to the user of the mobile device 102 via the user interface 208.

In some embodiments, the notification may be a route in the digital atlas 216 that a user may use to navigate from a start location to a destination location. For example, to generate a notification the processor 202 may be configured to receive a start location and a destination location from the user. The start location and destination location may be from the user's home to their place of employment. The user may also indicate the mode of transportation that the user wishes to use for the route. The processor 202 may generate a route using the start location and the destination location, wherein the route includes at least one intermediate location between the start location and the destination location. The intermediate location may be displayed to the user, or may only be accessible to the digital atlas 216.

The processor 202 may modify the route using the activity data and the set of real-time sensor data, wherein to modify the route includes changing at least one intermediate location based on the activity data and the set of real-time sensor data. Additionally, the processor 202 may modify the route using the set of user profile data and the set of static data. For example, the real-time sensor data may impact the intermediate location along the route and the digital atlas 216 may generate alternative intermediate locations, or a new route. The processor 202 may deliver the modified route to the mobile device 102, deliver the modified route to an application on the mobile device 102, or some combination thereof. In some embodiments, the processor 202 may deliver the modified route via the user interface 208.

In some embodiments, the digital atlas 216 may provide expense reporting to a user. For example, the user may travel a route, such as the route provided as part of a notification, and at the conclusion of the traveled route the digital atlas 216 may provide to the user a report on the route traveled. The report may include the costs associated with the route, such as gas, lodgings, and a customizable summary for the user of the digital atlas 216. This customizable summary may be used by users that travel on business and need to provide expense reports to their employer for costs associated with their trips.

In some embodiments, the digital atlas may provide a photo collage functionality to a user. For example, when the user travels a route, or uses the digital atlas 216, the user may capture photographs of their trip and save them onto their mobile device 102. The digital atlas may automatically assemble the photographs into an album that chronologically and geographically orders the photos to correspond to the trip taken by the user. The user may share these collections, or photo collages, with other users in the digital atlas community.

In some embodiments, the digital atlas 216 may provide audio tours of routes for users. For example, a user may be traveling from Chicago, Ill. to Salt Lake City, Utah. The user may plan their entire trip using the personalized and relevant suggestions of the digital atlas 216. As the user travels along the trip the digital atlas 216 may provide an audio tour of points of interest to the user as those points of interest are encountered along the way. Depending on the route the user took from Chicago, Ill. to Salt Lake City, Utah, the user may travel through Rocky Mountain National Park at which point the digital atlas may generate a notification to the user that an audio tour of the park is available for the user to listen to.

Generally, a user may use the digital atlas 216 as a complete trip planning tool. The user may open the digital atlas 216 and enter a start and destination for their trip. The user may answer a series of questions concerning a range for how long they wish to take on the trip, any sights they wish to see during the trip, the type of food they wish to eat along the trip, and any lodging preferences that the user may have. After all the questions the digital atlas 216 would plan the trip, complete with stops and even purchasing any lodging requirements, for the user. The digital atlas 216 may also have preset itineraries that users may select. In some cases the preset itineraries may be branded itineraries endorsed by celebrities such as Green Bay Packers Quarterback Aaron Rodgers. Trip planning may also be done by multiple users of the digital atlas 216. For example, each member of a family who is driving a separate car may be able to contribute to the planning of the trip by adding locations, stops, and so on. Additionally, once the trip is under way the other members of the family may alert the other digital atlas 216 users in the family that they wish to request a stop for the family (e.g. a break to use restrooms, or to eat) by throwing a flag, which may be an additional notification. By incorporating multiple users into the planning and active phases of trip taking the digital atlas 216 provides the user with value and a rich experience.

In some embodiments, there may also be a feature called "Follow Me" where there are multiple vehicles taking a trip. If one of the vehicles stops for a restroom break and wants to catch back up with the caravan they can simply change their route from final destination to catching up with the rest of their party, and the app will ping the location of the other phones in their trip running digital atlas and navigate to them.

Figure 3A:
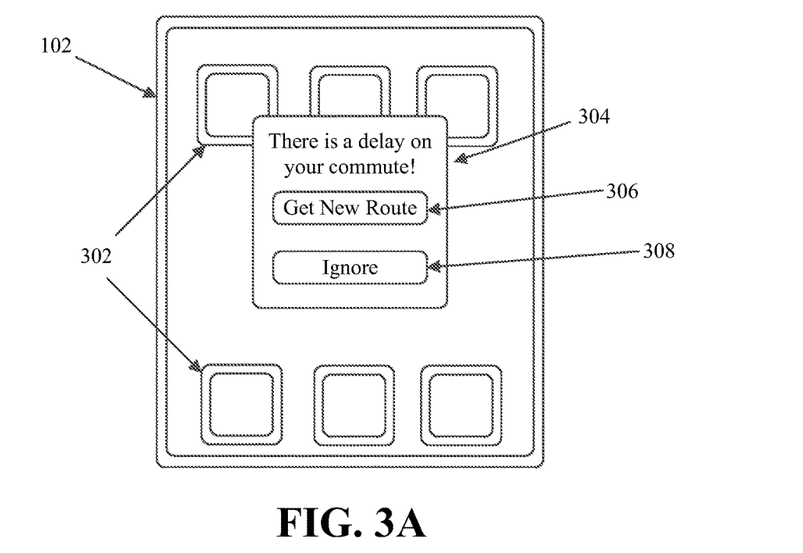
FIG. 3A illustrates an exemplary alert for a personalized and relevant notification.

Turning to some exemplary notifications, FIG. 3A illustrates an exemplary alert for a personalized and relevant notification. FIG. 3A includes a mobile device 102, application icons 302, an example personalized and relevant notification 304, and example notification options 306 and 308. For example, as described above, the digital atlas 216 may be running in the background on the user's mobile device 102 and the digital atlas 216 determines that it is ten minutes before a user typically leaves for their morning commute to work. The digital atlas 216 may receive real-time data related to the current weather or current traffic patterns and determine that there is a delay along the user's typical commute. The digital atlas 216 may generate a notification to the user which may appear as the example personalized and relevant notification 304. The user may then select to "Get New Route" 306, that would provide a new route to the user generated by the digital atlas, or "Ignore" 308 the example personalized and relevant notification 304.

Figure 3B:
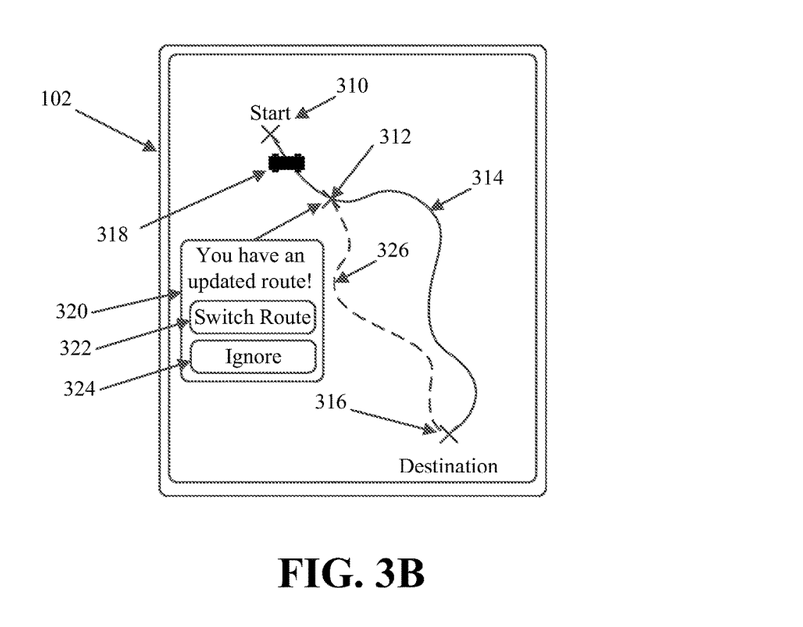
FIG. 3B illustrates an exemplary alternative alert for a personalized and relevant notification.

Similar to FIG. 3A, FIG. 3B illustrates an alternative alert for a personalized and relevant notification. FIG. 3B includes a mobile device 102, a start location 310, a delay location 312, a selected route 314, a destination location 316, the location of the user 318, an example personalized and relevant notification 320, example notification options 322 and 324, and a suggested route 326. As described with respect to the operation of the mobile device 102, the user may be in transit from start location 310 to destination 316. The user may be at location 318 along selected route 314 when the digital atlas 216 determines there is a significant traffic slowdown at delay location 312. The digital atlas 216 may generate and display the example personalized and relevant notification 320. The user may then select either of the example notification options 322 and 324. If the user were to select example notification option 322 the route that the digital atlas is providing to the user would switch from selected route 314 to suggested route 326. If the user were to select example notification option 324 the example personalized and relevant notification 320 would be ignored.

Figure 4:
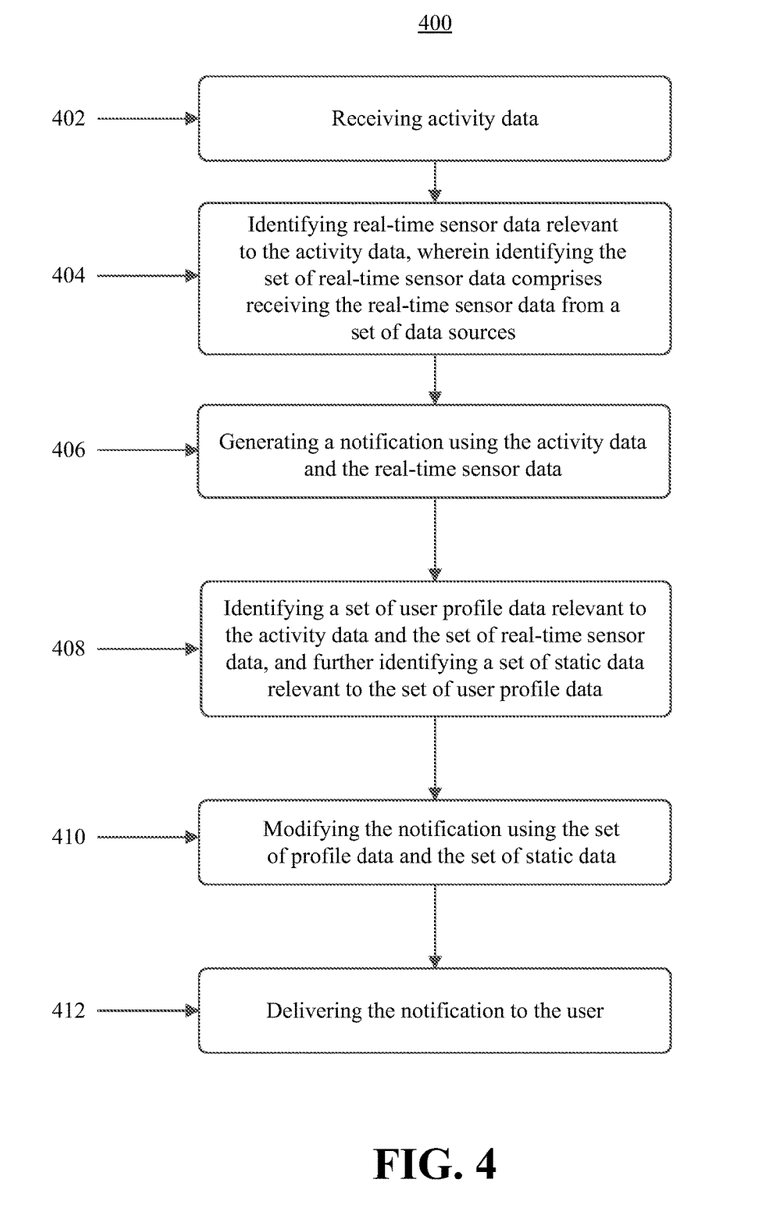
FIG. 4 illustrates a flowchart of an exemplary method that implements an embodiment of the notification system that generates and delivers personalized and relevant notifications to a user.

FIG. 4 illustrates a method 400 of an exemplary embodiment of the notification system that generates and delivers personalized and relevant notifications to a user. In the method 400, which may be executed by the personalized and relevant notification system, such as the digital atlas 216 of the mobile device 102 of FIGS. 1 and 2, may begin by receiving activity (block 402). The method may include identifying real-time sensor data relevant to the activity data (block 404). The method may also include generating a notification using the activity data and the real-time sensor data (block 406). The method includes identifying a set of user profile data relevant to the activity data and the set of real-time sensor data, and further identifying a set of static data relevant to the set of user profile data (block 408) via the digital atlas 216. The method also includes modifying the notification using the set of profile data and the set of static data (block 410). The method may include delivering the notification to the user (block 412). In other embodiments, the method 400 is executed by a separate application from the digital atlas 216, or is executed by a plurality of applications on the mobile device 102 including the digital atlas 216.

In certain embodiments, the digital atlas 216 may utilize machine learning techniques. The machine learning techniques may be cognitive learning, deep learning, combined learning, heuristic engines and algorithms, and/or pattern recognition techniques. For instance, a processor (such as the processor 202 of mobile device 102) or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, insurer database, and/or third-party database data, including historical auto insurance claim data. For example, the historical auto insurance claim data may be provided by a service provider the user has an agreement with like the insurer mentioned above. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more user device details, user request or login details, user device sensors, geolocation information, image data, an insurer database, a third-party database, and/or other data.

In one embodiment, a processing element (and/or machine learning or heuristic engine or algorithm discussed herein) may be trained by providing it with a large sample of images and/or user data with known characteristics or features, such as historical vehicle data and/or past auto claim data. Based upon these analyses, the processing element may learn how to identify characteristics and patterns that may then be applied to analyzing user device details (such as the mobile device 102), user vehicle details (such as the vehicle 104), user device sensors, geolocation information, image data, the insurer database, a third-party database, and/or other data. For example, the processing element may learn, with the user's permission or affirmative consent, to identify the user and/or insured vehicles, and/or learn to identify insured vehicles characteristics. The processing element may also be able to predict which vehicles are more prone to be involved in a vehicle collision, such as by vehicle characteristics determined from vehicle or other data, and utilize the predicted data to provide suggestions to the user of the digital atlas 216.

As described above, FIG. 2 illustrates a diagram of an exemplary mobile or other electronic device 102 (such as the mobile device 102 discussed with respect to FIGS. 1-3B) in which the functionalities as discussed herein may be implemented. It should be appreciated that the electronic device 102 may be configured to be transported in a vehicle, such as the vehicle 104 of FIG. 1, and/or connect to an on-board telematics platform of the vehicle, as discussed herein. Further, it should be appreciated that the electronic device 102 may be integrated into an on-board system of the vehicle. In some embodiments, the electronic device 102 may be a navigation device that comes integrated into a vehicle when the vehicle is manufactured.

The electronic device 102 may include a processor 202 as well as a memory 204. The memory 204 may store an operating system 212 capable of facilitating the functionalities as discussed herein as well as a set of applications 214 (i.e., machine readable instructions). For example, one of the set of applications 214 may be a notification application (the digital atlas application described above) 216 configured to provide personalized and relevant notifications. It should be appreciated that one or more other applications are envisioned.

The processor 202 may interface with the memory 204 to execute the operating system 212 and the set of applications 214. According to some embodiments, the memory 204 may also include other data 218 that may include any data (e.g., user preferences, suggested routes, data shared with the user, etc.) related to facilitating the functionalities as discussed herein. The memory 204 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 102 may further include a network interface 206 configured to communicate via a connection 108 to one or more networks 110. According to some embodiments, the network interface 206 may include one or more transceivers (e.g., WWAN, WLAN, and/or WPAN transceivers) functioning in accordance with IEEE standards, 3GPP standards, or other standards, and configured to receive and transmit data via one or more external ports. Further, the network interface 206 may include a short-range network component (e.g., an RFID reader) configured for short-range network communications. For example, the network interface 206 may receive, via the network 110, route data from a set of data sources, such as the data sources 106a . . . n described above in FIG. 1. For further example, the network interface 206 may transmit, via the network 110, notifications to nearby vehicle devices and/or RSE components.

The electronic device 102 may further include a set of sensors 210. The processor 202 and the set of applications 214, in particular the digital atlas 216, may interface with the set of sensors 210 to retrieve and process the corresponding sensor data. The set of sensors 210 may include, for example, a location module, an accelerometer, a gyroscope, one or more image sensors, and/or the like. In one particular implementation, the notification application 216 may use various data from the set of sensors 210 to facilitate certain functionalities.

The electronic device 102 may further include a user interface 208 configured to present information to a user and/or receive inputs from the user. As shown in FIG. 2, the user interface 208 may include a display screen and I/O components (e.g., ports, capacitive or resistive touch sensitive input panels, keys, buttons, lights, LEDs, speakers, microphones). According to some embodiments, the user may access the electronic device 102 via the user interface 208 to review information and/or perform other functions. In some embodiments, the electronic device 102 may perform the functionalities as discussed herein as part of a "cloud" network or may otherwise communicate with other hardware or software components within the cloud to send, retrieve, or otherwise analyze data. The electronic device 102 may communicate as part of the cloud network via the connection 108 and the network 110.

The electronic device 102 may further include a computer bus 220 configured to facilitate connection amongst the components of the electronic device. The components of the electronic device 102 are all connected to the bus allowing each component to communicate with each other component as necessary. The computer bus 220 may be an internal data bus, a memory bus, or a system bus. In some embodiments the computer bus 220 runs in parallel transmitting data over multiple parallel channels at the same time, and in other embodiments the computer bus 220 runs in serial transmitting data over a single channel.

In general, a computer program in accordance with the embodiments described herein may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 202 (e.g., working in connection with the operating system 212) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the preceding text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method for generating and delivering personalized and relevant notifications to a user, the method comprising:
   receiving, at a processor, activity data;
   identifying, by the processor, a set of real-time sensor data relevant to the activity data, wherein identifying the real-time sensor data comprises receiving the set of real-time sensor data from a set of data sources;
   generating, by the processor, a notification based on the activity data and the set of real-time sensor data, wherein to generate the notification comprises (i) receiving a start location and a destination location from the user, (ii) generating a route based on the start location and the destination location, wherein the route includes at least one intermediate location between the start location and the destination location, and (iii) modifying the route based on the activity data and the set of real-time sensor data, wherein to modify the route comprises changing at least one intermediate location based on the activity data and the set of real-time sensor data;
   identifying, by the processor, a set of user profile data relevant to the activity data and the set of real-time sensor data, and further identifying, by the processor, a set of static data relevant to the set of user profile data;
   modifying, by the processor, the notification based on the set of user profile data and the set of static data; and
   delivering, by the processor, the notification to the user.

2. The computer-implemented method of claim 1, wherein the activity data comprises activity data indicating the user has opened an application on a user device.

3. The computer-implemented method of claim 1, wherein the activity data comprises a time of day, a geographic location of the user, application data on a user device, past activity data for the user, predicted activity data for the user, or some combination thereof.

4. The computer-implemented method of claim 1, wherein the set of real-time sensor data comprises weather data, traffic data, or some combination thereof.

5. The computer-implemented method of claim 1, wherein the notification comprises a suggested route, a weather alert, a traffic alert, an event alert, or some combination thereof.

6. The computer-implemented method of claim 1, wherein the user profile data comprises preference data indicated by the user, favorites data received by the user from another user, or some combination thereof.

7. The computer-implemented method of claim 1, wherein the static data comprises event data, lodging data, restaurant data, parking data, or some combination thereof.

8. The computer-implemented method of claim 1, wherein modifying the notification further comprises:
   modifying the route based on the set of user profile data and the set of static data.

9. The computer-implemented method of claim 8, wherein delivering the notification to the user further comprises:
   delivering the modified route to a user device, delivering the modified route to an application on the user device, or some combination thereof.

10. A system for delivering personalized and relevant notifications to a user, the system comprising:
   a user interface configured to communicate with the user;
   a memory configured to store non-transitory computer executable instructions; and
   a processor configured to interface with the memory and the user interface, wherein the processor is configured to execute the non-transitory computer executable instructions to cause the processor to:
   receive activity data from a user;
   identify a set of real-time sensor data relevant to the activity data, wherein to identify the real-time sensor data comprises receiving the set of real-time sensor data from a set of data sources;
   generate a notification based on the activity data and the set of real-time sensor data, wherein to generate the notification comprises (i) receiving a start location and a destination location from the user, (ii) generating a route based on the start location and the destination location, wherein the route includes at least one intermediate location between the start location and the destination location, and (iii) modifying the route based on the activity data and the set of real-time sensor data, wherein to modify the route comprises changing at least one intermediate location based on the activity data and the set of real-time sensor data;
   identify a set of user profile data relevant to the activity data and the set of real-time sensor data, and further identify a set of static data relevant to the set of user profile data;
   modify the notification based on the set of user profile data and the set of static data; and
   deliver the notification to the user via the user interface.

11. The system of claim 10, wherein the activity data comprises activity data indicating the user has opened an application on a user device.

12. The system of claim 10, wherein the activity data comprises a time of day, a geographic location of the user, application data on a user device, past activity data for the user, predicted activity data for the user, or some combination thereof.

13. The system of claim 10, wherein the set of real-time sensor data comprises weather data, traffic data, or some combination thereof, received from a set of data sources.

14. The system of claim 10, wherein the notification comprises a suggested route, a weather alert, a traffic alert, an event alert, or some combination thereof.

15. The system of claim 10, wherein the user profile data comprises preference data indicated by the user, favorites data received by the user from another user, or some combination thereof, stored in the memory.

16. The system of claim 10, wherein the static data comprises event data, lodging data, restaurant data, parking data, or some combination thereof, received from a set of data sources.

17. The system of claim 10, wherein to modify the notification, the processor is configured to:
   modify the route based on the set of user profile data and the set of static data.

18. The system of claim 17, wherein to deliver the notification, the processor is configured to:
   deliver the modified route to a user device, deliver the modified route to an application on the user device, or some combination thereof.

* * * * *